United States Patent
Nagata

(10) Patent No.: US 10,589,438 B2
(45) Date of Patent: Mar. 17, 2020

(54) KNIT AND STEERING WHEEL

(71) Applicant: Takata Corporation, Tokyo (JP)

(72) Inventor: Kenshi Nagata, Shiga (JP)

(73) Assignee: JOYSON SAFETY SYSTEMS JAPAN K.K., Tokyo (JP)

(*) Notice: Subject to any disclaimer, the term of this patent is extended or adjusted under 35 U.S.C. 154(b) by 302 days.

(21) Appl. No.: 15/782,126

(22) Filed: Oct. 12, 2017

(65) Prior Publication Data
US 2018/0111638 A1    Apr. 26, 2018

(30) Foreign Application Priority Data

Oct. 25, 2016  (JP) ................ 2016-208953

(51) Int. Cl.
| B62D 1/06 | (2006.01) |
| H05B 3/34 | (2006.01) |
| B26D 1/06 | (2006.01) |
| B60H 1/00 | (2006.01) |

(52) U.S. Cl.
CPC ............ *B26D 1/065* (2013.01); *H05B 3/345* (2013.01); *B60H 1/00292* (2013.01); *H05B 2203/003* (2013.01); *H05B 2203/015* (2013.01)

(58) Field of Classification Search
CPC .............. H05B 3/345; H05B 2203/003; H05B 2203/015; B62D 1/065
See application file for complete search history.

(56) References Cited

U.S. PATENT DOCUMENTS

| 975,359 | A * | 11/1910 | Hefter ...................... D04B 1/14 219/549 |
| 3,472,289 | A * | 10/1969 | Riordan .................. H05B 3/347 139/425 R |
| 4,631,976 | A | 12/1986 | Noda et al. |
| 4,983,814 | A * | 1/1991 | Ohgushi ................... H05B 3/34 219/545 |
| 5,412,181 | A * | 5/1995 | Giamati ................. H05B 3/342 219/212 |
| 5,484,983 | A * | 1/1996 | Roell ....................... D04B 1/12 219/528 |
| 6,294,770 | B1 * | 9/2001 | Hasegawa .............. D04B 21/12 219/201 |
| 8,278,602 | B2 | 10/2012 | Yoneyama et al. |
| 2003/0150850 | A1 * | 8/2003 | Michelmann ........... H05B 3/12 219/545 |
| 2005/0061802 | A1 * | 3/2005 | Rock ........................ D04B 1/04 219/545 |
| 2009/0308857 | A1 | 12/2009 | Asami et al. |

(Continued)

FOREIGN PATENT DOCUMENTS

| EP | 1199241 | 10/2008 |
| JP | S58-170662 | 10/1983 |

(Continued)

OTHER PUBLICATIONS

Machine translation of Japan Patent document No. 2014-162,330, Sep. 2019.*

Primary Examiner — Geoffrey S Evans
(74) Attorney, Agent, or Firm — IPUSA, PLLC

(57) ABSTRACT

A knit includes a knitted fabric into which a ground yarn is knitted and a heater wire configured to be energized to generate heat to heat a vehicle member. The heater wire is inlaid into the knitted fabric by inlay stitch.

7 Claims, 5 Drawing Sheets

(56) References Cited

U.S. PATENT DOCUMENTS

2011/0084055 A1* 4/2011 Park .......................... B60L 1/02
                                                         219/204
2014/0296749 A1* 10/2014 Reid, Jr. ............... A61B 5/6812
                                                         600/587

FOREIGN PATENT DOCUMENTS

| JP | S61-218475 | 9/1986 |
| JP | H01-166480 | 6/1989 |
| JP | 2003-157955 | 5/2003 |
| JP | 4150477 | 9/2008 |
| JP | 2010-215140 | 9/2010 |
| JP | 4699949 | 6/2011 |
| JP | 4876832 | 2/2012 |
| JP | 5304139 | 10/2013 |
| JP | 2014-162330 | 9/2014 |
| WO | 2007/122881 | 11/2007 |

* cited by examiner

KNIT AND STEERING WHEEL

CROSS-REFERENCE TO RELATED APPLICATION

This application is based upon and claims priority to Japanese Patent Application No. 2016-208953, filed on Oct. 25, 2016, the entire contents of which are incorporated herein by reference.

BACKGROUND OF THE INVENTION

1. Field of the Invention

The present invention relates to knits and steering wheels.

2. Description of the Related Art

A conventional knit in which metal resistor filaments energized to generate heat are knitted, being entwined with a ground yarn, is known. (See, for example, Japanese Laid-open Patent Publication No. 1-166480). Furthermore, a steering wheel that contains heater wires for heating the rim is known. (See, for example, Japanese Laid-open Patent Publication No. 2014-162330.)

SUMMARY OF THE INVENTION

According to an aspect of the present invention, a knit includes a knitted fabric into which a ground yarn is knitted and a heater wire configured to be energized to generate heat to heat a vehicle member. The heater wire is inlaid into the knitted fabric by inlay stitch.

According to an aspect of the present invention, a steering wheel includes a rim and a knit contained in the rim. The knit includes a knitted fabric into which a ground yarn is knitted and a heater wire configured to be energized to generate heat to heat a vehicle member. The heater wire is inlaid into the knitted fabric by inlay stitch.

The object and advantages of the invention will be realized and attained by means of the elements and combinations particularly pointed out in the claims.

It is to be understood that both the foregoing general description and the following detailed description are exemplary and explanatory and not restrictive of the invention.

DETAILED DESCRIPTION OF THE PREFERRED EMBODIMENTS

According to the knit of Japanese Laid-open Patent Publication No. 1-166480, metal resistor wires are entwined with a ground yarn to form a knitted fabric. The knitted fabric, however, is likely to lose shape because metal resistor wires that are different in quality from the ground yarn constitute the knitted fabric.

According to an aspect of the present invention, a heat-releasable knit whose knitted fabric is less likely to lose shape and a steering wheel including the knit are provided.

According to an aspect of the present invention, a heat-releasable knit whose knitted fabric is less likely to lose shape is provided because heater wires are inlaid into the knitted fabric by inlay stitch (inlay knitting).

An embodiment of the present invention is described below with reference to the accompanying drawings.

Figure 1:
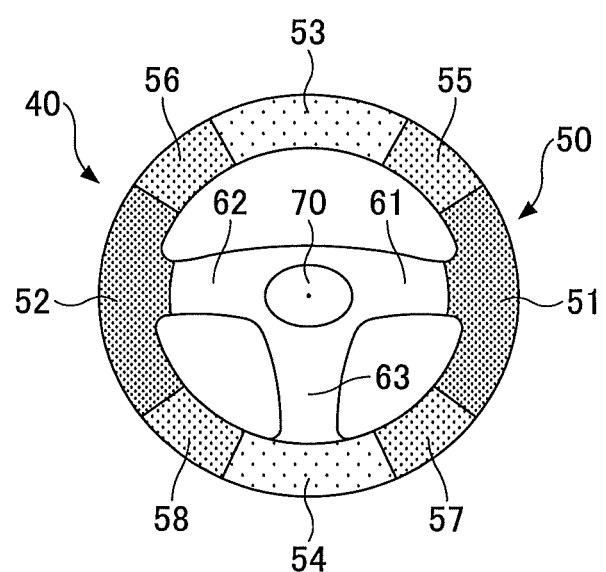
FIG. 1 is a front view of a steering wheel, illustrating a configuration of the steering wheel according to an embodiment.

FIG. 1 is a front view of a steering wheel, illustrating a configuration of the steering wheel. Referring to FIG. 1, a steering wheel 40, which is an operating member operated by a driver to steer a vehicle, includes, for example, a rim 50, a hub 70, a right spoke 61, a left spoke 62, and a bottom spoke 63.

The rim 50 is an annular part gripped by the driver. For example, the rim 50 may be a part formed into a circularly annular shape or may be a part formed into other annular shapes such as an elliptically annular shape. The rim is also referred to as a grip.

The rim 50 includes a right rim part 51, a left rim part 52, a top rim part 53, a bottom rim part 54, a top right rim part 55, a top left rim part 56, a bottom right rim part 57, and a bottom left rim part 58.

In the steering wheel 40, "top (upper)," "bottom (lower)," "left," and "right" indicate directions in the case of viewing the steering wheel 40 at a neutral position (a position for causing a vehicle to move straight) from a front-side (driver-side) viewpoint. The areas of these rim parts 51 through 58 are roughly indicated by dotted patterns in the rim 50 in FIG. 1.

The right rim part 51 is a right side portion that spreads at a predetermined angle (for example, 50°) in each of the upward direction and the downward direction relative to a virtual line that laterally extends through the center of the steering wheel 40. The left rim part 52 is a left side portion that spreads at a predetermined angle (for example, 50°) in each of the upward direction and the downward direction relative to the virtual line that laterally extends through the center of the steering wheel 40. The top rim part 53 is a top (upper) side portion that spreads at a predetermined angle (for example, 20°) in each of the rightward direction and the leftward direction relative to a virtual line that vertically extends through the center of the steering wheel 40. The bottom rim part 54 is a bottom (lower) side portion that spreads at a predetermined angle (for example, 20°) in each of the rightward direction and the leftward direction relative to the virtual line that vertically extends through the center of the steering wheel 40. The top right rim part 55 is the top right portion between the right rim part 51 and the top rim part 53. The top left rim part 56 is the top left portion between the left rim part 52 and the top rim part 53. The bottom right rim part 57 is the bottom right portion between the right rim part 51 and the bottom rim part 54. The bottom left rim part 58 is the bottom left portion between the left rim part 52 and the bottom rim part 54.

The hub 70 is a part located at the center inside the rim 50. A vehicle-body-side steering shaft is coupled to the hub 70. A horn plate to which an airbag module is fixed is attached to the hub 70. The hub 70 is offset toward the steering shaft (in a direction away from the driver) relative to the rim 50.

The right spoke 61 is a part that couples the hub 70 and the right rim part 51. The left spoke 62 is a part that couples the hub 70 and the left rim part 52. The bottom spoke 63 is a part that couples the hub 70 and the bottom rim part 54. The number of spokes is not limited to three, and may be, for example, four.

Figure 2:
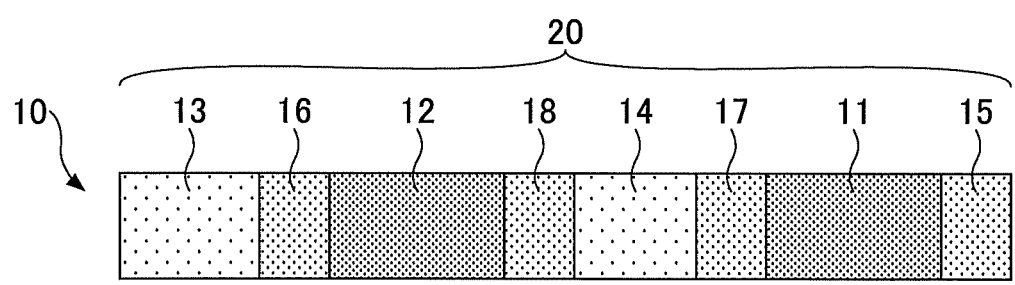
FIG. 2 is a diagram illustrating an array of heater areas of a knit according to the embodiment.

FIG. 2 is a diagram illustrating an array of heater areas (ranges) provided in a knitted fabric 20 of a knit 10 contained in the rim 50. The knit 10 is contained in the rim 50, being elongated along a circumferential direction of the rim 50 (with a longitudinal direction of the knit 10 coinciding with a circumferential direction of the rim 50). The heater areas are provided in the knitted fabric 20 to correspond to the positions of the rim parts 51 through 58 to be heated by the respective heater areas with the knit 10 contained in the rim 50.

Referring to FIG. 2, a heater area 11 is a heater area for heating the right rim part 51. A heater area 12 is a heater area for heating the left rim part 52. A heater area 13 is a heater area for heating the top rim part 53. A heater area 14 is a heater area for heating the bottom rim part 54. A heater area 15 is a heater area for heating the top right rim part 55. A heater area 16 is a heater area for heating the top left rim part 56. A heater area 17 is a heater area for heating the bottom right rim part 57. A heater area 18 is a heater area for heating the bottom left rim part 58.

According to the knit 10, multiple heater areas that are different in heater wire density are defined in the knitted fabric 20. As a result, compared with a configuration where heater areas are equal in heater wire density, the amount of use of heater wires is reduced, thus making it possible to reduce power consumption along with cost.

For example, a heater wire is provided at a lower density in the heater area 13 or 14 than in the heater area 11 or 12. This makes it possible to reduce cost and power consumption while ensuring a heating effect to heat the right rim part 51 or the left rim part 52 that is more frequently gripped by the driver than the top rim part 53 or the bottom rim part 54.

Furthermore, in three adjacent heater areas, a heater wire is denser in the middle heater area than in one of the other two heater areas adjacent to the middle heater area, and is sparser (less dense) in the middle heater area than in the other of the other two heater areas. This makes it possible to suppress a sharp change in temperature between rim parts to reduce an uncomfortable feeling of the driver.

For example, a heater wire is denser in the heater area 15 than in the heater area 13, and is sparser in the heater area 15 than in the heater area 11. As a result, it is possible to suppress a sharp change in temperature between, for example, the right rim part 51 and the top rim part 53 to reduce an uncomfortable feeling of the driver.

The same applies to the other rim parts. The heater wire is denser in the heater area 16 than in the heater area 13, and is sparser in the heater area 16 than in the heater area 12. The heater wire is denser in the heater area 17 than in the heater area 14, and is sparser in the heater area 17 than in the heater area 11. The heater wire is denser in the heater area 18 than in the heater area 14, and is sparser in the heater area 18 than in the heater area 12.

Figure 3:
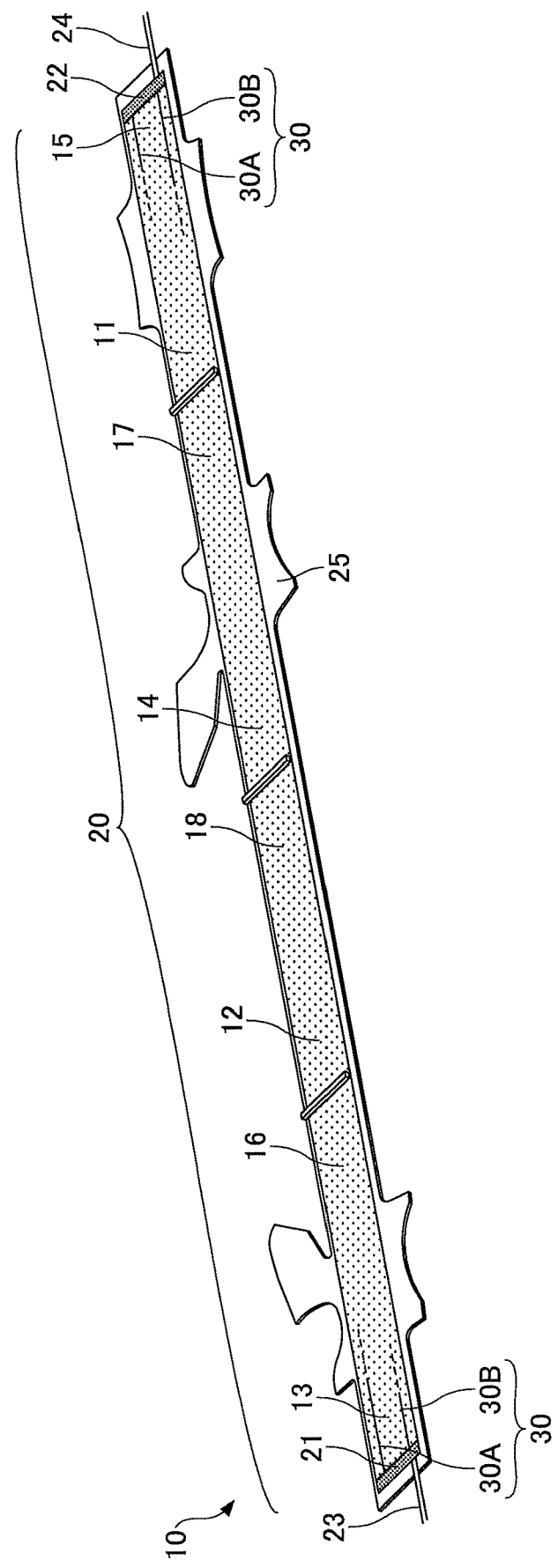
FIG. 3 is a perspective view of the knit, illustrating a configuration of the knit according to the embodiment.

FIG. 3 is a diagram illustrating a configuration of the knit 10.

The knit 10 is interposed between a surface skin part 25 of the rim 50 and a cover that covers a metal core in the rim 50. The cover is formed of an elastic body of, for example, a urethane resin. The surface skin part 25 is formed of leather or resin. The surface skin part 25 is directly touched by the driver.

FIG. 3 illustrates a configuration where the knit 10 is attached to the interior of the surface skin part 25. According to this configuration, a subassembly formed of the surface skin part 25 and the knit 10 attached to the interior of the surface skin part 25 is so attached to the cover as to position the knit 10 between the cover and the surface skin part 25.

Electrodes 21 and 22 forming a pair are provided one at each longitudinal end of the knit 10. The electrode 21 is connected to a lead wire 23 to be connected to the positive electrode of a power supply. The electrode 22 is connected to a lead wire 24 to be connected to the negative electrode of the power supply. One or more heater wires 30 are connected between the electrodes 21 and 22. FIG. 3 illustrates a configuration (partially omitted) where two heater wires 30A and 30B are connected in parallel between the electrodes 21 and 22. When a voltage is applied across the electrodes 21 and 22 by the power supply, all of the one or more heater wires 30 are energized to generate heat. The heat generated by the heater wires 30 heats the rim parts 51 through 58 corresponding to the heater areas 11 through 18, respectively.

The electrodes 21 and 22 are, for example, copper plates. The electrodes 21 and 22 and the heater wires 30 may be soldered or bonded using an electrically conductive adhesive.

Figure 4:
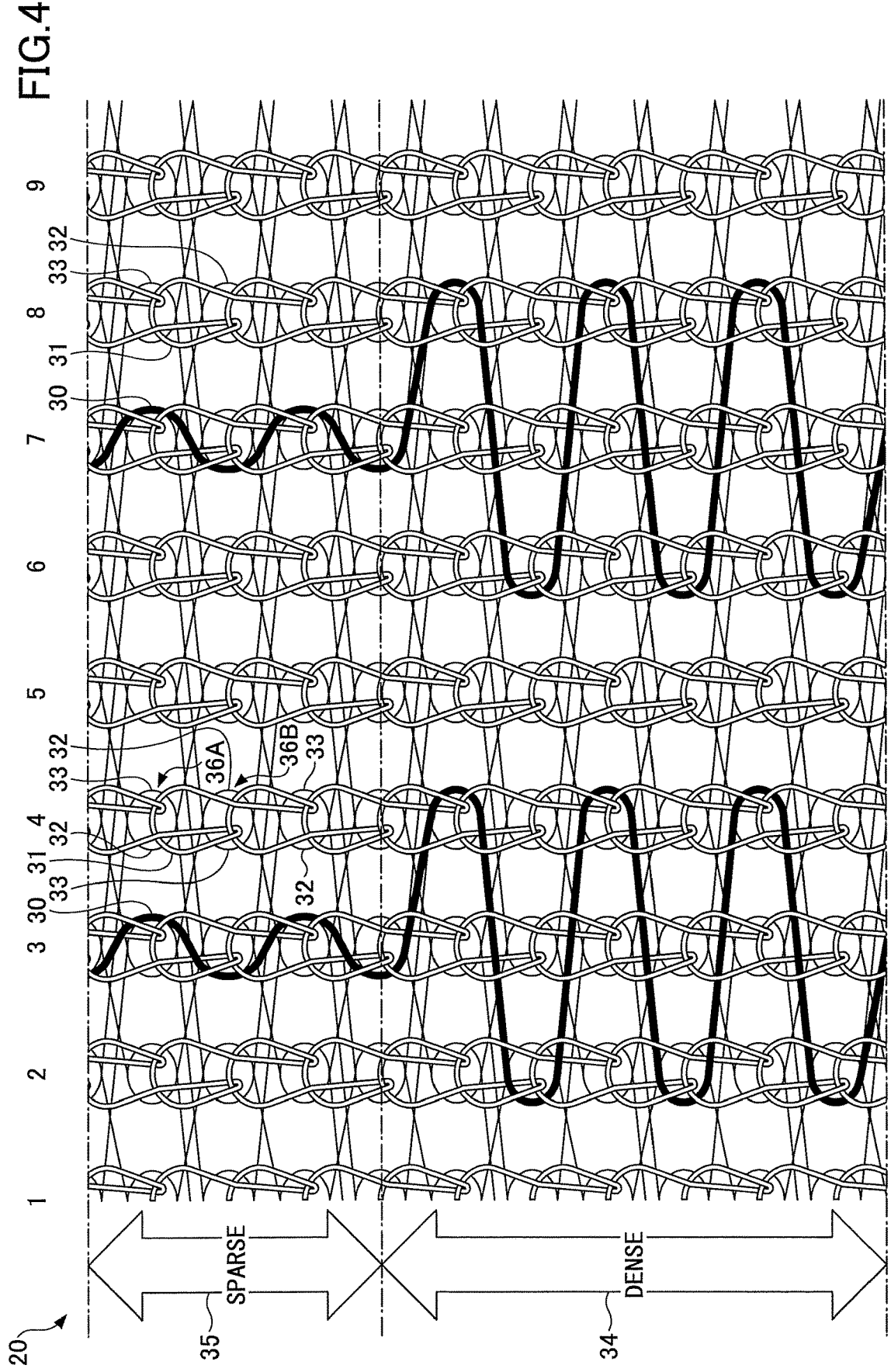
FIG. 4 is an enlarged view of a knitting structure of a knitted fabric according to the embodiment.

FIG. 4 is an enlarged view of a knitted fabric, illustrating a knitting structure of the knitted fabric. The knitted fabric 20 depicted in FIG. 4 is a knitted fabric into which a ground yarn 31 is knitted by chain stitch. Chain stitch is a knitting technique in which the ground yarn 31 moves in the same wale. A vertical column of loops is referred to as a wale, and a lateral row of loops is referred to as a course. In FIG. 4, each of numbers 1 through 9 appearing at the top indicates the column number of a wale.

Specific suitable materials for the ground yarn 31 include, for example, organic natural fibers such as cotton, wool, and linen, organic synthetic fibers such as polyamide, polyester, and acryl, and mixed yarns of such organic natural and synthetic fibers. The thickness of the ground yarn 31 may be, but is not limited to, approximately 75 deniers.

Specific examples of the heater wires 30 include a single thread or a twisted yarn of, for example, copper, a copper alloy, or stainless steel and a composite filament into which such a metal thread or yarn and an organic fiber are twisted. The thickness of the heater wires 30 is preferably, but is not limited to, 70 μm to 80 μm in diameter. The surface of each heater wire 30 is preferably coated with, for example, polyurethane enamel to prevent a short circuit with other heater wires 30.

The heater wires 30 are inlaid into the knitted fabric 20 by inlay stitch. That is, the heater wires 30 by themselves do not form loops of the knitted fabric 20. Because the heater wires 30 serve as inlay threads, the loops of the knitted fabric 20 do not become undone even when the heater wires 30 are broken. Accordingly, although the heater wires 30 that are different in quality from the ground yarn 31 are included in the knit 10, the knitted fabric 20 and the knit 10 are less likely to lose shape. Furthermore, the strength of the knitted fabric 20 is stabilized to make the loops of the knitted fabric 20 less likely to become undone.

Inlay threads different from the heater wires 30 are inlaid into the knitted fabric 20 by inlay stitch. FIG. 4 illustrates the two heater wires 30 and two kinds of inlay threads 32 and 33. The inlay thread 32 is inlaid, being entwined with two adjacent columns of wales. The inlay thread 33 is inlaid, being entwined with three adjacent columns of wales. Thus, by inlaying inlay threads different from the heater wires 30 into the knitted fabric 20 by inlay stitch, it is possible to prevent the knitted fabric 20 knitted by chain stitch from becoming undone. The number of wales with which an inlay thread is entwined is not limited to the above-described numbers. Furthermore, the number of kinds of inlay threads different from the heating wires 30 is not limited to two, and may be three or more.

The inlay threads 32 and 33 are entwined with common loops of the knitted fabric 20 from directions opposite to each other. As a result, the knitted fabric 20 including the heater wires 30 is more stably formed. For example, in the wale of the fourth column, the inlay thread 32 is entwined with a loop 36A from one side in a course direction (a crosswise direction of the knitted fabric 20) and the inlay thread 33 is entwined with the same loop 36A from the other side in the course direction. Furthermore, in the wale of the fourth column, the inlay thread 32 is entwined with a loop 36B adjacent to the loop 36A in a wale direction (a longitudinal direction of the knitted fabric 20) from the other side in the course direction and the inlay thread 33 is entwined with the same loop 36B from the one side in the course direction. With respect to the wales of columns other than the fourth column as well, the inlay threads 32 and 33 are entwined with common loops of the knitted fabric 20 from opposite directions. The number of inlay threads entwined with a common loop is not limited to two, and may be three or more.

In the knitted fabric 20, the density of the heating wires 30 in the wale direction differs between heater areas. For example, the number of wales with which the heater wires 30 are entwined differs between heater areas. For example, in the case of FIG. 4, one heater wire 30 is entwined with wales of three adjacent columns in a dense area 34, and is entwined with a wale of only one column, which is less than three columns, in a sparse area 35. By thus changing the density of the heater wires 30 in the wale direction, it is possible to cause the amount of heat generation to differ from heater area to heater area as illustrated in FIG. 2. For example, the sparse area 35 corresponds to the heater area 13, and the dense area 34 next to the sparse area 35 in the wale direction corresponds to the heater area 16 next to the heater area 13.

Figure 5:
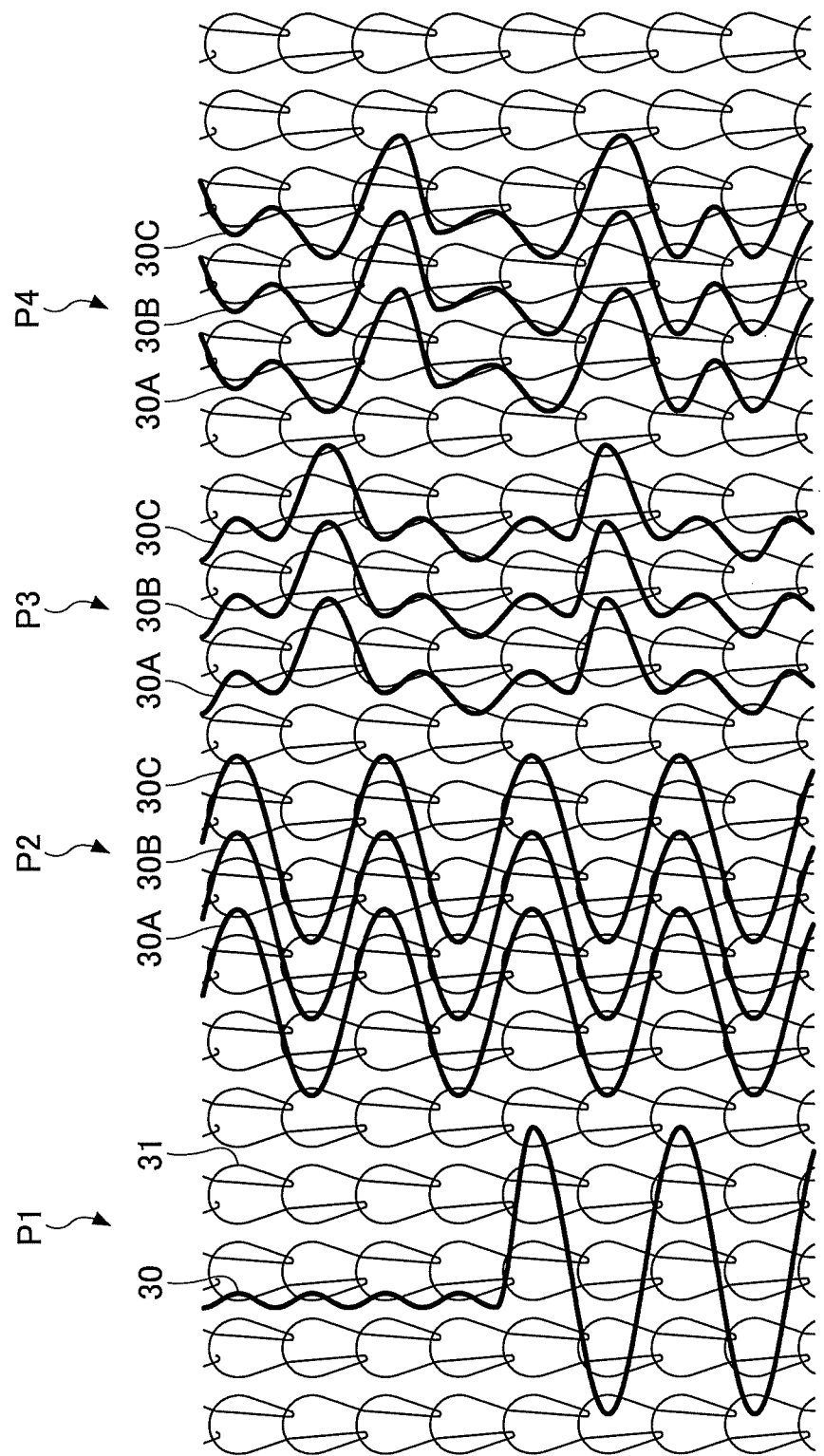
FIG. 5 is a diagram illustrating variations of a dense heater wire arrangement.

FIG. 5 is a diagram illustrating variations of a dense heater wire arrangement. An inlay pattern P1 illustrates a configuration where the number of wales with which one heater wire 30 is entwined changes along the wale direction. Each of inlay patterns P2, P3, and P4 illustrates the case of inlaying multiple heater wires 30 to form a dense heater area (a heater area of a high heater wire density). The inlay pattern P2 illustrates a configuration where three heater wires, namely, the heater wires 30A and 30B and a heater wire 30C, are each entwined with wales of four adjacent columns, parallel to one another. The inlay patterns P3 and P4 illustrate configurations where the three heater wires 30A, 30B, and 30C are each entwined with wales of three adjacent columns, parallel to one another.

Figure 6:
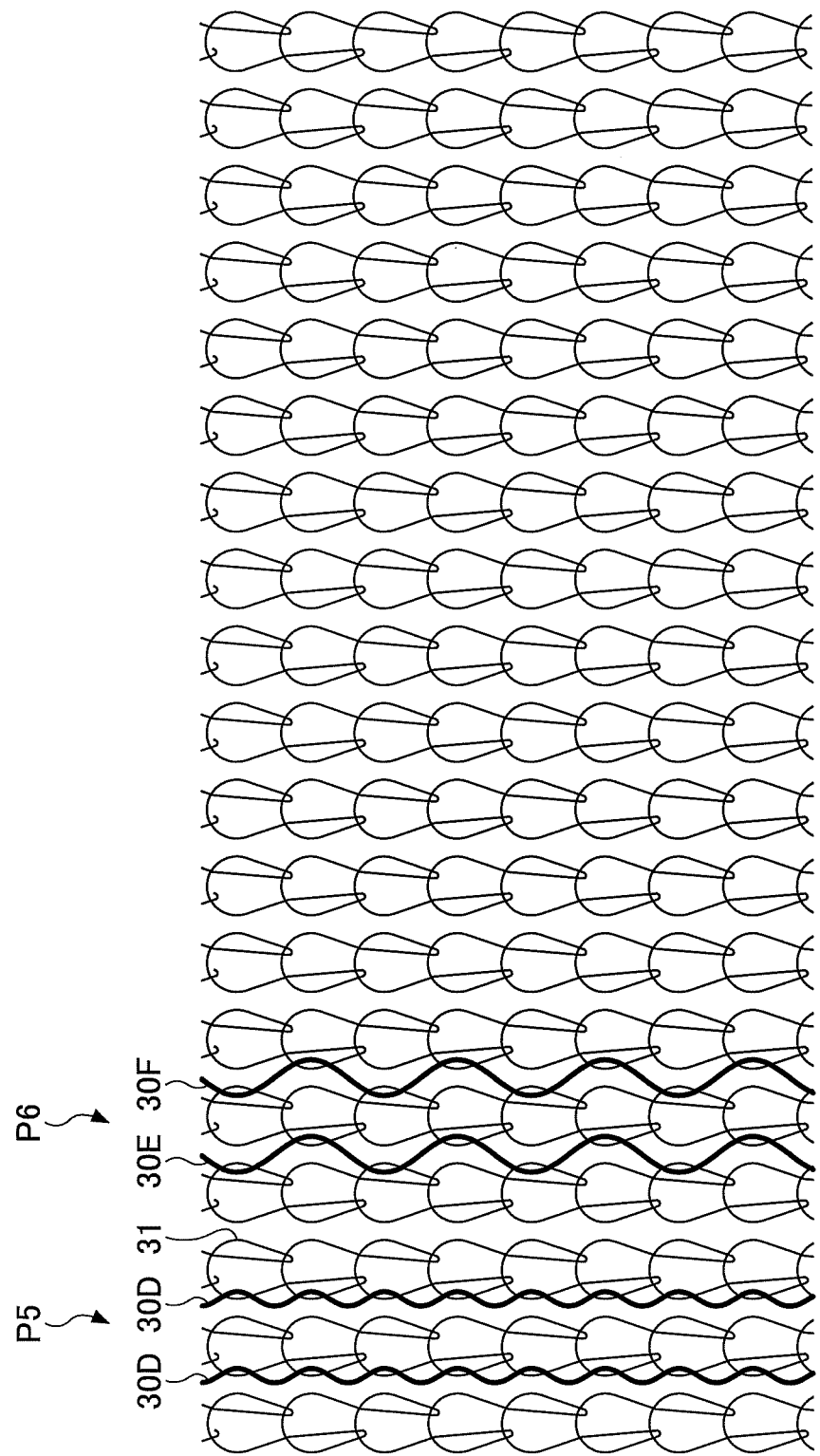
FIG. 6 is a diagram illustrating variations of a sparse heater wire arrangement.

FIG. 6 is a diagram illustrating variations of a sparse heater wire arrangement. An inlay pattern P5 illustrates the case of forming a sparse heater area (a heater area of a low heater wire density) by independently forming two heater wires 30D, each entwined with a wale of a single column, parallel to each other. An inlay pattern P6 illustrates the case of forming a sparse heater area by entwining one heater wire 30E with the wales of the first column and the second column and entwining another heater wire 30F with the wales of the second column and the third column among the wales of three adjacent columns.

The density of the heater wires 30 may alternatively be controlled by the interval between adjacent wales. For example, in the inlay pattern P5, the heater wire density per unit area decreases as the interval between adjacent wales increases when the number of heater wires within the unit area remains the same. For example, in the inlay pattern P6, the heater wire density per unit area increases as the interval between adjacent wales increases when the number of heater wires remains the same (because the length of the heater wire across the interval increases).

In FIGS. 5 and 6, a depiction of inlay threads entwined with multiple wales (such as the inlay threads 32 and 33 of FIG. 4) is omitted.

A knit and a steering wheel are described above based on an embodiment. The present invention, however, is not limited to the specifically disclosed embodiment, and variations and modifications may be made without departing from the scope of the present invention.

For example, the form of a knitted fabric is not limited to the form where a ground yarn is knitted by chain stitch, and may be the form where a ground yarn is knitted by other warp knitting such as Denbigh stitch. Furthermore, the form of a knitted fabric is not limited to the form where a heater wire is inlaid by inlay stitch into a knitted fabric knitted out of a ground yarn by warp knitting, and may be the form where a heater wire is inlaid by inlay stitch into a knitted fabric knitted out of a ground yarn by weft knitting.

Furthermore, while a steering wheel is taken as an example of a vehicle member to be heated by a knit in the above-described embodiment, vehicle members other than a steering wheel (for example, part of a driver or passenger seat) may be heated by a knit.

What is claimed is:
1. A knit comprising:
    a knitted fabric knitted from a ground yarn;
    a heater wire configured to be energized to generate heat to heat a vehicle member, the heater wire being inlaid into the knitted fabric by inlay stitch; and
    a plurality of inlay threads different from the heater wire, the inlay threads being inlaid into the knitted fabric by inlay stitch,
    wherein the inlay threads are entwined with a common loop of the knitted fabric from opposite directions.
2. The knit as claimed in claim 1, wherein the knitted fabric includes a plurality of heater areas, and a density of the heater wire is different in each of the heater areas.
3. The knit as claimed in claim 2, wherein the density of the heater wire is different in each of the heater areas in a wale direction of the knitted fabric.
4. The knit as claimed in claim 2, wherein a number of wales with which the heater wire is entwined is different in each of the heater areas.
5. The knit as claimed in claim 1, wherein the vehicle member is a steering wheel.
6. The knit as claimed in claim 5, wherein
    the heater wire is provided at a lower density in a heater area for heating a top rim part or a bottom rim part of the steering wheel than in a heater area for heating a right rim part or a left rim part of the steering wheel.
7. A steering wheel comprising:
    a rim; and
    a knit contained in the rim,
    the knit including
        a knitted fabric knitted from a ground yarn;
        a heater wire configured to be energized to generate heat to heat a vehicle member, the heater wire being inlaid into the knitted fabric by inlay stitch; and a plurality of inlay threads different from the heater wire, the inlay threads being inlaid into the knitted fabric by inlay stitch, wherein the inlay threads are entwined with a common loop of the knitted fabric from opposite directions.

* * * * *